Patented Apr. 30, 1946

2,399,237

UNITED STATES PATENT OFFICE 2,399,237

POLISHING MATERIAL AND PROCESS OF PREPARING SAME

William T. Maloney, Clinton, N. Y.

No Drawing. Application December 15, 1942, Serial No. 469,142

18 Claims. (Cl. 51—308)

The present invention relates to an improved polishing material particularly adapted for use in polishing glass lens blanks and other glass products and to a process of preparing the same.

Prior to my invention finely divided red iron oxide, known commercially as "polishing rouge," was generally used in polishing lens and in other situations where it was desired to produce highly polished glass surfaces. Whether artificially prepared or derived from natural sources, this material has been rather expensive and except when the best and most expensive grades have been used, the polishing rate has been slow.

It has also been proposed to utilize silica as a polishing material, but silica products, as heretofore produced, and which are sometimes referred to as "white rouge," have had rather low polishing efficiency usually not equal to the red rouge products available.

My invention is based on my discovery that when silica sands and similar siliceous materials are appropriately ground and classified and then subjected to a further treatment according to the procedure hereinafter described, the polishing efficiency is greatly enhanced as compared with the white rouge products heretofore available, and may equal, and in some cases exceed, in grinding and polishing efficiency the best of the red rouge products.

My invention has for one object to produce a polishing material having a polishing efficiency comparable with the better grades of iron oxide rouge polishing materials of the prior art and which can be produced at a lower cost than these prior materials.

Other objects and advantages of my invention will appear from the appended description.

According to my invention an amorphous silica sand, preferably one that is substantially free from impurities, is ground in a ball mill or other equivalent grinding apparatus until a desired proportion has been reduced to a fineness within the range desired for the finished material. This material is then subjected to a suitable classification treatment to separate out the particles of the desired particle size range from the coarser particles and also to remove any undue proportion of colloidal and similar extremely fine particles. The classification may be effected either by dry or wet classification methods known to the art.

The desired fine fraction resulting from the classification treatment is then mixed with a relatively small amount of one or more of the sulfates and chlorides of the group including the following: $H_2SO_4$, $Al_2(SO_4)_3$, $FeSO_4$, $CuSO_4$, $ZnSO_4$, $CdSO_4$, $BaCl_2$, $CrSO_4$, $CoSO_4$, $Li_2SO_4$, $MgSO_4$, $MnSO_4$, $NiSO_4$, $SnSO_4$, $VSO_4$, and $ZnCl_2$. In lieu of one of the salts specified an equivalent addition of the sulfate radical by means of a dilute sulfuric acid solution will also produce a substantial improvement in the polishing efficiency of the product.

In order to insure the desired admixture and intimacy of contact between the metal salt used in the treatment and the silica material, the salt is preferably added in the form of an aqueous solution. The resulting mixture is stirred until the metal salt is evenly distributed throughout the fine silica product. It is then finally dried and made ready for shipment.

Only a small addition of the metal salt is needed to produce the desired improved result. Generally it will suffice for the purpose to add sufficient of the salt to insure that an aqueous suspension of the fine silica has been brought slightly on the acid side, say to a pH of between 6 and 7, and no commensurate additional advantage is gained by reducing the pH value below about 5.

As typical of a commercial application of my invention, a silica sand, of the grade known as "Amorphous Illinois" and obtained from deposits located near Cairo, Illinois, is mixed with water in the proportion of about 7 pounds of sand to one gallon of water and is then ground in a ball mill for approximately 2½ hours or until approximately 90% will pass a 325 mesh screen. The resulting product is then further diluted to 3 pounds of sand to a gallon of water. Sodium silicate is then added as a dispersing agent in an amount sufficient to bring the pH value of the suspension to around 9.5 to 10. The suspension is thoroughly stirred and then allowed to stand for 30–45 minutes, or until the coarser particles have separated as a hard cake on the bottom of the settling tank. The portion remaining in suspension is then drawn off. The desired fraction will usually show a fineness of at least 90% minus 5 microns. Sufficient zinc sulfate is then added to flocculate the suspended silica particles and bring the pH value of the suspension to between 6 and 7. The flocculated silica, either directly or after settling and decanting off a part of the water, is then transferred to an open pan evaporator and dried. At the conclusion of the drying step the treated silica is ready for use.

The product obtained by using zinc sulfate as the flocculating and acidifying agent will show a polishing efficiency equal to or better than that of the best grades of iron oxide rouge heretofore available. In a polishing test using a polisher of the type made by the American Optical Company and known by their designation as M422A, Bowl Feed Polisher, a 1⅞ inch spectacle lens blank was polished for ten minutes with the gradual addition of 50 grams of my polishing product suspended in water, and at the end of that period the blank showed a loss in weight of .0812 gram. This compares with a loss of weight of around .03 gram when using an average run of red rouge polishing materials and with around .075 gram for the better and more expensive grades of rouge. A similar polishing test of my silica product produced without the acidifying treatment showed a polishing efficiency of .0384 gram. Similar tests with the products produced with the use in the acidifying state of one of the other sulfates or chlorides hereinbefore listed, show improvements in the polishing efficiency of the product of upwards of 50% as compared with the plain ground silica product that has not been subjected to the subsequent acidifying treatment.

Although I have described the process as including a dispersing step and a subsequent flocculating step, it will be understood that the flocculating step may be omitted and that the acid salt may be added to the ground silica at a different stage of the process. For example, the acid salt may be added to the batch of ground silica while it is being dried or even when the ground silica is in a dry state, as, for example, when recovered by air separation. In either case the resulting mixture is thoroughly stirred to uniformly distribute the acid salt through the mass. When employing a wet classification of the ground silica, the use of a dispersing step has the advantage of facilitating the separation of the undesired coarser silica particles, and likewise, the addition of the acidifying agent after dispersion has the double advantage of facilitating the collection and recovery of the desired silica fraction and imparting to the product the degree of acidity that has been found effective to produce the improved polishing efficiency.

It has been observed that when certain of the salts are used in the acidifying step there is a tendency for the product to lose the enhanced polishing efficiency on standing or aging. For example, while a product treated with ferrous sulfate was a satisfactory polishing material when used immediately after it was prepared, practically all of the advantage of the acidifying treatment was lost when the product had stood or aged for 24 hours. On the other hand, the product treated with cupric sulfate retained its enhanced polishing efficiency indefinitely. Zinc sulfate was also found to be entirely satisfactory from the standpoint of aging. The product treated with alum stood up somewhat less well on aging. It was also observed that this product showed a tendency to stain glass which would be objectionable when polishing lens and lens blanks for certain purposes, but for other purposes would offer no disadvantage since the optical efficiency of the glass is in no way impaired.

While I have described the acidifying treatment of the silica product as taking place immediately after classification of the silica and preparatory to its drying and packaging, it will be understood that this step may be postponed until the silica product is about to be put to the intended use. In other words, the silica may be ground, classified, dried and then shipped to the lens polisher or other glass grinding or polishing establishment, and at that point it may be given the acidifying treatment immediately before it is to be used in the grinding and polishing operations.

It will be understood that the silica may be prepared and classified by other methods than that specifically hereinbefore described. Various known grinding or classifying steps may be employed and in place of a wet classification the desired sizing or classification may be carried on in an air separator. When this is done it will usually be preferable to subject the fine air classified fraction to an alkaline dispersion treatment before adding the acidifying agent. It will also be understood that the length of the grinding time may be varied. I have found, however, that when the grinding is carried on for too long a time too many fines will be produced, thus necessitating a double classification, the coarse particles from the first classification being returned for re-grinding as usual and the extreme fines discarded.

It will be understood that various other acidifying agents than those enumerated herein may be employed within the recognized range of chemical equivalents and that various modifications in the preparation of the material and in the manner of its use may be resorted to without departing from the object of my invention, which is not to be deemed as limited other than as indicated by the scope of the appended claims.

I claim:
1. A glass polishing material consisting of an alkaline dispersed suspensoid fraction of classified finely pulverized silica and an acidifying agent selected from the group consisting of $Al_2(SO_4)_3$, $FeSO_4$, $CuSO_4$, $ZnSO_4$, $CdSO_4$, $BaCl_2$, $CrSO_4$, $CoSO_4$, $Li_2SO_4$, $MgSO_4$, $MnSO_4$, $NiSO_4$, $SnSO_4$, $VSO_4$, $ZnCl_2$ and $H_2SO_4$, said agent being present in sufficient amount to impart a pH value of less than 7 when said fraction is suspended in water.

2. A glass polishing material consisting of an alkaline dispersed suspensoid fraction of classified finely pulverized silica, at least 90% thereof having a fineness of minus 5 microns, and cupric sulfate in an amount sufficient to impart a pH value of less than 7 when said fraction is suspended in water.

3. A glass polishing material consisting of an alkaline dispersed suspensoid fraction of classified finely pulverized silica, at least 90% thereof having a fineness of minus 5 microns, and zinc sulfate in an amount sufficient to impart a pH value of less than 7 when said fraction is suspended in water.

4. A glass polishing material consisting of an alkaline dispersed suspensoid fraction of classified finely pulverized silica, at least 90% thereof having a fineness of minus 5 microns, and aluminum sulfate in an amount sufficient to impart a pH value of less than 7 when said fraction is suspended in water.

5. A glass polishing material consisting of a classified fraction of ground silica at least 90% of which is of a fineness of 5 microns, or finer, and a minor proportion of zinc sulfate, and which material shows a pH value between 5 and 7 when suspended in water.

6. The process of preparing a glass polishing material which comprises grinding a silica sand until at least 90% will pass a 325 mesh screen, suspending the ground silica in water in the presence of an alkaline dispersing agent, subjecting the resulting suspension to a classification treatment to separate coarser particles and recover a finer fraction at least 90% of which is of a fineness of 5 microns or less in diameter, and thereafter treating said finer fraction with an acidifying agent selected from the group consisting of $H_2SO_4$, $Al_2(SO_4)_3$, $FeSO_4$, $CuSO_4$, $ZnSO_4$, $CdSO_4$, $BaCl_2$, $CrSO_4$, $CoSO_4$, $Li_2SO_4$, $MgSO_4$, $MnSO_4$, $NiSO_4$, $SnSO_4$, $VSO_4$ and $ZnCl_2$ in sufficient amount to impart a pH value of less than 7 when said fraction is suspended in water.

7. The process of preparing a glass polishing material which comprises grinding a silica sand until at least 90% will pass a 325 mesh screen, suspending the ground silica in water in the presence of an alkaline dispersing agent, subjecting the resulting suspension to a classification treatment to separate coarser particles and recover a finer fraction at least 90% of which is of a fineness of 5 microns or less in diameter, and thereafter treating said finer fraction with cupric sulfate in sufficient amount to impart a pH value of less than 7 when said fraction is suspended in water.

8. The process of preparing a glass polishing material which comprises grinding a silica sand until at least 90% will pass a 325 mesh screen, suspending the ground silica in water in the presence of an alkaline dispersing agent, subjecting the resulting suspension to a clasification treatment to separate coarser particles and recover a finer fraction at least 90% of which is of a fineness of 5 microns or less in diameter, and treating said finer fraction with zinc sulfate in sufficient amount to impart a pH value of less than 7 when said fraction is suspended in water.

9. The process of preparing a glass polishing material which comprises grinding a silica sand until at least 90% will pass a 325 mesh screen, suspending the ground silica in water in the presence of an alkaline dispersing agent, subjecting the resulting suspension to a classification treatment to separate coarser particles and recover a finer fraction at least 90% of which is of a fineness of 5 microns or less in diameter, and treating said finer fraction with aluminum sulfate in sufficient amount to impart a pH value of less than 7 when said fraction is suspended in water.

10. The method of improving the polishing efficiency of silica polishing materials which comprises suspending such a material in finely divided form in water in the presence of an alkaline dispersing agent, and thereafter treating the material with an acidifying agent selected from the group consisting of $H_2SO_4$, $Al_2(SO_4)_3$, $FeSO_4$, $CuSO_4$, $ZnSO_4$, $CdSO_4$, $BaCl_2$, $CrSO_4$, $CoSO_4$, $Li_2SO_4$, $MgSO_4$, $MnSO_4$, $NiSO_4$, $SnSO_4$, $VSO_4$ and $ZnCl_2$ in sufficient amount to at least neutralize the alkalinity imparted by said dispersing agent.

11. The method of improving the polishing efficiency of silica polishing materials which comprises suspending such a material in finely divided form in water in the presence of an alkaline dispersing agent, and thereafter treating the material with cupric sulfate in sufficient amount to at least neutralize the alkalinity imparted by said dispensing agent.

12. The method of improving the polishing efficiency of silica polishing materials which comprises suspending such a material in finely divided form in water in the presence of an alkaline dispersing agent, and thereafter treating the material with zinc sulfate in sufficient amount to at least neutralize the alkalinity imparted by said dispersing agent.

13. The method of improving the polishing efficiency of silica polishing materials which comprises suspending such a material in finely divided form in water in the presence of an alkaline dispersing agent, and thereafter treating the material with aluminum sulfate in sufficient amount to at least neutralize the alkalinity imparted by said dispersing agent.

14. A glass polishing material comprising a sodium silicate dispersed suspensoid fraction of classified finely pulverized silica to which has been added an acidifying agent selected from the group consisting of $Al_2(SO_4)_3$, $FeSO_4$, $CuSO_4$, $ZnSO_4$, $CdSO_4$, $BaCl_2$, $CrSO_4$, $CoSO_4$, $Li_2SO_4$, $MgSO_4$, $MnSO_4$, $NiSO_4$, $SnSO_4$, $VSO_4$, $ZnCl_2$ and $H_2SO_4$, said agent being present in sufficient amount to impart a pH value of less than 7 when said fraction is suspended in water.

15. A glass polishing material comprising a sodium silicate dispersed suspensoid fraction of classified finely pulverized silica, at least 90% thereof having a fineness of minus 5 microns, and zinc sulfate in an amount sufficient to impart a pH value of less than 7 when said fraction is suspended in water.

16. The process of preparing a glass polishing material which comprises grinding a silica sand until at least 90% will pass a 325 mesh screen, suspending the ground silica in water in the presence of sodium silicate, subjecting the resulting suspension to a classification treatment to separate coarser particles and recover a finer fraction at least 90% of which is of a fineness of 5 microns or less in diameter, and thereafter treating said finer fraction with an acidifying agent selected from the group consisting of $H_2SO_4$, $Al_2(SO_4)_3$, $FeSO_4$, $CuSO_4$, $ZnSO_4$, $CdSO_4$, $BaCl_2$, $CrSO_4$, $CoSO_4$, $LiSO_4$, $MgSO_4$, $MnSO_4$, $NiSO_4$, $SnSO_4$, $VSO_4$, and $ZnCl_2$ in sufficient amount to impart a pH value of less than 7 when said fraction is suspended in water.

17. The process of preparing a glass polishing material which comprises grinding a silica sand until at least 90% will pass a 325 mesh screen, suspending the ground silica in water in the presence of sodium silicate, subjecting the resulting suspension to a classification treatment to separate coarser particles and recover a finer fraction at least 90% of which is of a fineness of 5 microns or less in diameter, and treating said finer fraction with zinc sulfate in sufficient amount to impart a pH value of less than 7 when said fraction is suspended in water.

18. The method of improving the polishing efficiency of silica polishing materials which comprises suspending such a material, of a fineness such that at least 90% will pass a 325 mesh screen, in water in the presence of sodium silicate, subjecting the resulting suspension to a classification treatment to separate coarser particles and recover a finer fraction at least 90% of which is of a fineness of 5 microns or less in diameter, and thereafter treating the material with zinc sulfate in sufficient amount to at least neutralize the alkalinity imparted by said sodium silicate.

WILLIAM T. MALONEY.